United States Patent [19]

Hisatake et al.

[11] Patent Number: 5,682,217
[45] Date of Patent: Oct. 28, 1997

[54] LIQUID CRYSTAL DISPLAY DEVICE IN WHICH NO STICKING PHENOMENON OCCURS WITH HIGH CONTRAST

[75] Inventors: Yuzo Hisatake; Takeshi Yamamoto; Hoko Hirai; Hitoshi Hatoh, all of Kanagawa-ken; Yoshihiro Kinoshita, Saitama-ken, all of Japan

[73] Assignee: Kabushiki Kaisha Toshiba, Kanagawa-ken, Japan

[21] Appl. No.: 390,161

[22] Filed: Feb. 17, 1995

Related U.S. Application Data

[63] Continuation of Ser. No. 995,177, Dec. 24, 1992, abandoned.

[30] Foreign Application Priority Data

Dec. 26, 1991 [JP] Japan ................ 3-344592
Mar. 13, 1992 [JP] Japan ................ 4-053984

[51] Int. Cl.$^6$ ................................................ G02F 1/1337
[52] U.S. Cl. ................................................ 349/123
[58] Field of Search ............................ 359/102, 63, 99, 359/75, 78; 349/128, 123, 136, 179

[56] References Cited

U.S. PATENT DOCUMENTS

| | | | |
|---|---|---|---|
| 4,906,073 | 3/1990 | Hunahata et al. | 359/102 |
| 5,048,933 | 9/1991 | Asano et al. | 359/102 |
| 5,058,998 | 10/1991 | Yoshida et al. | 359/102 |
| 5,106,529 | 4/1992 | Ichimura et al. | 359/102 |
| 5,124,825 | 6/1992 | Asano et al. | 359/102 |
| 5,249,070 | 9/1993 | Tahano | 359/102 |
| 5,309,264 | 5/1994 | Lien et al. | 359/87 |

FOREIGN PATENT DOCUMENTS

| | | |
|---|---|---|
| 0 259 822 | 3/1988 | European Pat. Off. . |
| 0 352 792 | 1/1990 | European Pat. Off. . |
| 0 481 700 A3 | 4/1992 | European Pat. Off. . |
| 60-182416 | 9/1985 | Japan . |
| 61-137129 | 6/1986 | Japan . |
| 61-226730 | 10/1986 | Japan . |

OTHER PUBLICATIONS

Database WPIL, Week 8723, Derwent Publications Ltd., London, GB, AN 87-159746 & JP-A-62 080 621 (Konishiroku Photo) 14 Apr. 1987.

Revue de Physique Appliquee, "Optically Active Additives in Twisted Nematic Devices", E. P. Raines, vol. 10, No. 3, May 1975, Paris, France, pp. 117-120.

*Primary Examiner*—William L. Sikes
*Assistant Examiner*—James A. Dudek
*Attorney, Agent, or Firm*—Finnegan, Henderson, Farabow, Garrett & Dunner, L.L.P.

[57] ABSTRACT

In a liquid crystal display device in which a twisted nematic liquid crystal layer of positive dielectric anisotropy is sandwiched between two substrates fitted with electrodes and liquid crystal molecule orientation films, and in which the angle of intersection of the liquid crystal molecular alignment directions on the surfaces of the two substrates is $\theta$ ($0° < \theta < 90°$) and the cell twist angle is $\phi$ which is determined to give a uniform twist alignment to the liquid crystal layer by the tilt orientation on the two substrates, the liquid crystal molecule orientation films have a twist angle $\omega$ which is $+\theta+180°$ or $+\theta-180°$ when $\phi$ is $+\theta$, and which is $-\theta+180°$ or $-\theta-180°$ when $\phi$ is $-\theta$, in the state when a voltage applied to the liquid crystal layer is less than a threshold voltage.

3 Claims, 12 Drawing Sheets

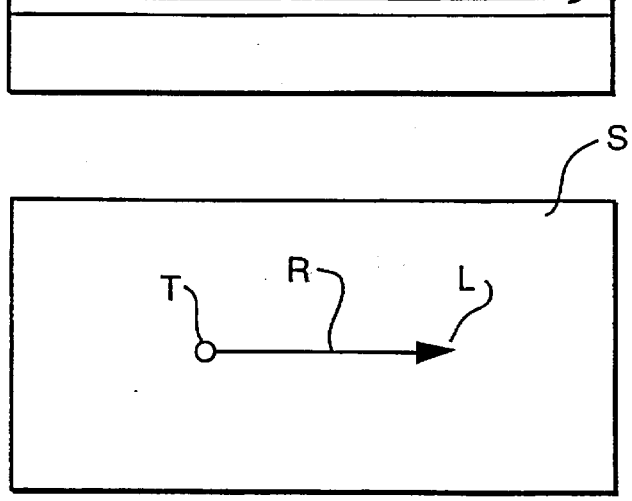
FIG. 2(a)
FIG. 2(b)
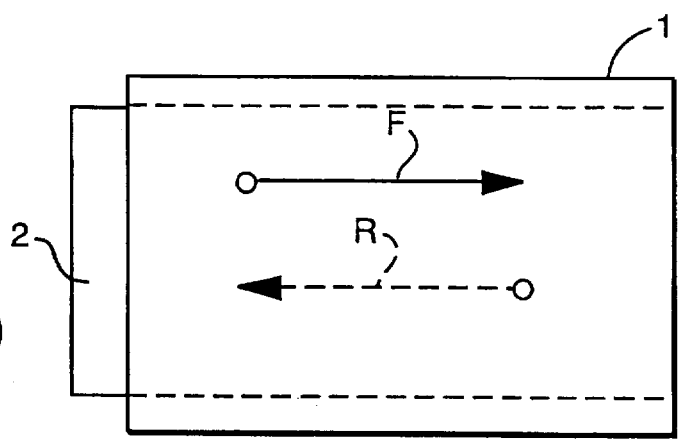
FIG. 3(a)
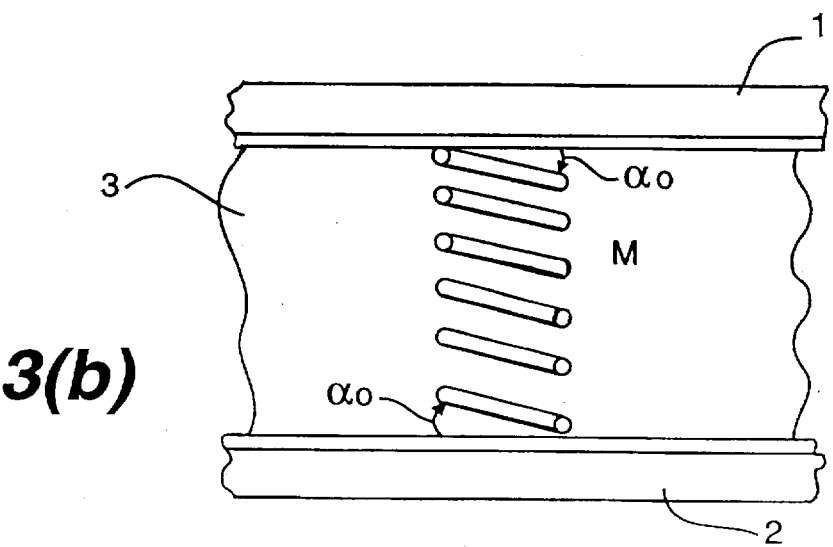
FIG. 3(b)

←—) □ ABCD CHARGE SHIFT DIRECTIONS WHEN THE
←--- SQUARE ABCD IS MADE THE DISPLAY PATTERN
( SOLID LINE ) : $d/2 \leq z \leq d$
( DOTTED LINE ) : $0 \leq z \leq d/2$

LIQUID CRYSTAL DISPLAY DEVICE IN WHICH NO STICKING PHENOMENON OCCURS WITH HIGH CONTRAST

This application is a continuation of application Ser. No. 07/995,177, filed Dec. 24, 1992, now abandoned.

BACKGROUND OF THE INVENTION

1. Field of the Invention

This invention relates to a liquid crystal display device.

2. Description of the Prior Art

In recent years, liquid crystal display devices (hereafter, 'LCD') have become widely used in such devices as word processors, personal computers, projection TVs and compact TVs.

Most of these LCDs use twisted nematic liquid crystals, and the display systems can be broadly classified into the two modes of the refraction mode and the rotatory polarization mode.

Also, the mainstream twist angles are approximately 90°, or more than 90° but less than 270°. Since the former have intense rotatory polarization, they are mainly used for the rotatory polarization mode, while the latter are mainly used for the birefringence mode.

This birefringence mode display system with a twist angle of more than 90° but less than 270° is generally called the 'super-twist' (ST) system. Since it has steep electro-optical characteristics, a large volume display can be easily obtained by time-sharing driving, even with a simple matrix type electrode composition which does not have a switching element (TFT or TFD) for every pixel. Also, since the birefringence effect is used in these ST systems, the display colours are yellow and dark blue, the so-called 'yellow mode', or white and blue, the so-called 'blue mode' As a means of eliminating these display colourings, a proposal has been made for the combination of an optical compensator (a liquid crystal cell, or a retardation film, with a reverse twist alignment to the liquid crystal display) with the liquid crystal display cell. Although the above ST system is less costly, it can obtain a large volume display for black and white or color. Therefore, it is widely used for office automation (OA) equipment and the like.

In a liquid crystal display device which uses the prior art ST system, the liquid crystal molecular alignment in the cell is the so-called 'uniform alignment' when a voltage is not applied. That is to say, it has a structure in which a namatic liquid crystal composition of positive dielectric anisotropy is sandwiched between substrates.

The liquid crystal molecule major axes have pre-tilt angles on the surfaces of the substrates. The angle of intersection of the liquid crystal molecular alignment directions on the surfaces the two substrates is $\theta$ ($0°\leq\theta\leq 90°$). if the cell twist angle is $\phi$, which is determined to give a uniform twist alignment to the liquid crystal composition by the tilt orientations on the two substrates, when the voltage applied to the liquid crystal composition is less than a threshold voltage, and when $\phi$ is $\pm\theta+180°$ or $\pm\theta-180°$ (for convenience, + when the direction of twist is to the left, and − when to the right), the twist angle of the liquid crystal is $\pm\theta+180°$ or $\pm\theta-180°$. In this type of prior art ST cell, the problem of "sticking" arises, that is to say, when a first pattern is displayed on the screen and then this display pattern is updated, the previous pattern remains faintly.

As described above, there was a problem with liquid crystal display devices which used the prior art ST system in that, when any pattern was displayed for a long time, even when the pattern was changed, a phenomenon occurred in which the previous pattern could still be seen, that is to say sticking occurred. Also there was the problem that, because of the operating principle, the viewing angle was narrowly limited.

SUMMARY OF THE INVENTION

The object of this invention is to provide a liquid crystal display device which reduces sticking and has stable orientation with steep electro-optical characteristics and, moreover a wide viewing angle.

Briefly, in accordance with one aspect of the invention, there is provided a liquid crystal display device in which two substrates fitting two transparent electrodes facing each other;

a twisted nematic liquid crystal layer of positive dielectric anisotropy sandwiched between the electrodes applying a voltage to the layer; and liquid crystal molecule orientation films deposited on the electrodes for causing a pre-tilt orientation, which aligns the major axes of liquid crystal molecules of the liquid crystal layer in one direction on surfaces of the substrates, and in which an angle of intersection of the liquid crystal alignment directions on the surfaces of the substrates is $\theta$ ($0°\leq\theta\leq 90°$) and a cell twist angle is $\phi$, which is determined to give a uniform twist alignment to the liquid crystal layer by the tilt orientation on the substrates, the liquid crystal molecule orientation films comprising:

means for taking a twist angle $\omega$ of the liquid crystal layer that when $\phi$ is $\pm\theta$ (positive (+) means that the rotation of twist is to the left-handed rotation, and negative (−) means that the rotation of twist is a right-handed rotation), the twist angle $\omega$ of the liquid crystal layer is $\pm\theta+180°$ or $\pm\theta-180°$ (double sign of same order), in the state when the voltage applied to the liquid crystal layer is less than a threshold voltage.

Also, it provides a liquid crystal display device which has the characteristic that, when the liquid crystal layer thickness is d and the helical pitch of the liquid crystal composition is P, and taking P as positive when the helical direction is left and as negative when the direction is right, when $\phi$ is $\pm\theta$ and the liquid crystal twist angle is $\pm\theta+180°$, the ratio d/P is $$\pm\theta+180°-90° < d/P \times 360° < \pm\theta+180°+90°$$

and when $\phi$ is $\pm\theta$ and $\omega$ is $\pm\theta-180°$, the ratio d/P is $$\pm\theta-180°-90° < d/P \times 360° < \pm\theta-180°+90°$$

when $\phi$ is $\pm\theta$ and $\omega$ is $\pm\theta-180°$, (double sign of same order).

Moreover, the design is that the sizes of the pre-tilt angles of the liquid crystal molecules on the two substrate differ from each other, and that there is practically no hysteresis in the curves of optical transmission—voltage applied to the liquid crystal composition.

Furthermore, it is a liquid crystal display device in which the liquid crystal molecule alignment region which forms one pixel is composed of two or more types of liquid crystal molecule alignment regions in which the liquid crystal molecule alignment states differ from each other.

This invention is a device which achieves the above objects. The following is a description of the theory and methods which attain these objects.

First, the orientation of liquid crystal is described, for the better understanding of the splay orientation which is the liquid crystal molecule alignment concerned in this invention.

The molecules of nematic liquid crystals are narrow and thread-shaped. When liquid crystal molecules are in contact with the orientation film of a substrate a rubbed surface, the major axes of the rod-shaped molecules orientate in a uniform direction which depends on the properties of orientation film surface. When a polyimide film is rubbed by Pubbing orientation treatment, the liquid crystal molecules are orientated in lines along the direction of rub. Also, when a polystyrene orientation film is rubbed, the molecules line up in a direction at a right angle on the film surface to the direction of rub.

Also, there is another method of orientation treatment by the vapour deposition of an orientation film on the substrate. If silicon oxide is obliquely vapour-deposited on the surface of the substrate with an angle of incidence of 85°, the major axes of the liquid crystal molecules will line up in the direction of the start of the vapour deposition.

However, as shown in FIG. 2(a), in these orientation treatments, liquid crystal molecule M is not orientated parallel to orientation film surface S, but is orientated rising at a specified angle of α0 from the orientation film surface, that is to say, substrate surface S. This angle is 1° to 15° for polyimide orientation film. This angle which the liquid crystal major axis LA in contact with the substrate surface forms with the substrate surface is called the pre-tilt angle.

Liquid crystal molecules have no directional property in the major axis direction. However, in FIG. 2(a), if the end of liquid crystal major axis LA which has risen from the substrate is taken as leading portion L and the end in contact with the substrate is taken as trailing portion T, for the purposes of explanation, for example, aligned liquid crystal molecule M can be expressed by arrow sign R in the direction of T or R as shown in FIG. 2(b).

As shown in FIG. 3(b), a gap is made between two glass substrates 1 and 2, made to face each other, which each have an orientation film. If liquid crystal 3 is filled into this gap, liquid crystal molecules M in the liquid crystal exhibit various states according to the orientation treatment of the orientation films.

In FIG. 3(a), if the molecular alignment of the upper substrate, i.e. front substrate, is taken as F (solid line arrow), and the molecular alignment of the lower substrate, that is to say rear substrate 2, is taken as R (peaked line arrow), these alignments are facing in reverse directions, i.e. directions which differ by 180°.

In this case, as shown in FIGS. 3(a) and (b), if liquid crystal material without twist ability, e.g. containg no chyral dopant, uses, liquid crystal molecules M maintain pre-tilt angle α₀ from upper substrate 1 to lower substrate 2. Therefore, the liquid crystal molecules are aligned with a specified and uniform angle through the entire thickness of liquid crystal layer 3. Generally, this type of alignment is called 'uniform alignment', and this is the basic structure of liquid crystal display devices in prior art.

With a liquid crystal display device of this structure, as shown in FIG. 4, if a voltage of greater than the threshold voltage, that is a driving voltage, is applied to the liquid crystal layer, the liquid crystal molecules uniformly align themselves in a direction perpendicular to the substrates following the direction in which the liquid crystal molecules in the vicinity of the two substrate surface tilt.

FIG. 6 shows the state when lower substrate 2 is twisted by angle θ (≦90°), taking upper substrate 1 as a reference.

The molecular alignment at this time becomes one in which the liquid crystal between the two substrates is twisted by angle θ while maintaining a uniform alignment. This molecular alignment is realized in consequence of being selected liquid crystal materials with twisting ability that angle is φ. This molecular alignment is called the twisted uniform alignment. This angle φ is called the twist angle of uniform alignment. By the way, an angle φ of the prior art ST cell is more than 90° but less than 270°, and the molecular alignment is the twisted uniform alignment.

FIG. 5 shows the transmittance-voltage curve of the prior apt ST cell that φ is 180°, and shows that the state changes steeply above a certain voltage, that is threshold voltage Vth. Also, when a voltage less than the threshold voltage is applied to the cell, the liquid crystal moleculars alignment of the prior art ST cell leaves the same alignment when an applied voltage is 0. Accordingly, a liquid crystal molecular alignment of a cell with a twist angle of more than 90° but less than 270° is defined on condition that applied voltage is less than threshold voltage. While, transmissivity is expressd by value γ, which is the difference between the value of 90% and 10% transmissivity divided by the applied voltage when the transmissivity is 90%.

In a liquid crystal display device with this structure, in the same way as in the case of a uniform alignment without the above twist, when a voltage greater than the threshold voltage is applied to the liquid crystal layer, the liquid crystal molecules are uniformly aligned, in a direction perpendicular to the substrates following the direction of tilt of the liquid crystal molecules in the vicinity the surfaces of the two substrates, as shown in FIG. 4.

As can be seen from FIG. 6, the twist angle θ of uniform alignment expresses the angle to leading portion, $L_R$ of the liquid crystal molecules with orientation R of the lower substrate, taking trailing portion $T_F$ of the liquid 1 crystal molecules with orientation F of the upper substrate as the reference.

θ is defined in two ways, one is the positive (+) of the left turn as shown in FIG. 6, and the other is the negative (−) of the right turn as shown in FIG. 7.

On the other hand, an alignment of liquid crystal molecules such as shown in FIG. 8(a) is also possible. This molecular alignment is realized when liquid crystal materials without twisting ability is sandwiched between two substrates as shown in FIG. 8(a), as same structure as shown in FIG. 3(b).

First, as can be seen from FIG. 8(a), the molecular alignments F and R of the upper and lower substrates are in the same direction. The angle of molecular alignment gradually decreases from the pre-tilt angle α₀ of upper substrate 11 and, after becoming parallel with substrate 11 at the midpoint d/2 of liquid crystal layer thickness d, it tilts with a reverse angle until it reaches the pre-tilt angle α₀ of lower substrate 12 as shown in FIG. 8(b). That is to say, leading portions $L_F$ and $L_R$ are in close contact with each other, while trailing portions $T_F$ and $T_R$ are aligned but separated from each other. This type of alignment is called 'splay alignment'. Then, when it is twisted by the angle θ to this splay alignment, in the same way as for the uniform alignment and the twisted uniform alignment, a liquid crystal alignment can be realized.

As shown in FIG. 9, in the same way as for the uniform alignment in FIG. 6, in order to maintain splay alignment in a state in which orientation R of lower substrate 12 crosses orientation F of upper substate 11 by θ, as can be seen from FIG. 9, the liquid crystal molecules must be twisted by the angle formed by trailing portion $T_F$ of orientation T of upper substrate 11 and trailing portion $T_R$ of orientation R of lower substrate 12. If this twist angle in splay alignment is taken as ω since θ is positive (+) when taking the left turn θ of FIG. 9, splay alignment twist angle $ω_L$ becomes (θ+180°) and since θ is negative (−) when taking the right turn θ of FIG. 9, splay alignment twist angle $ω_R$ becomes its complementary angle (θ−180°).

Also, when taking the right turn θ of FIG. 10, since θ is negative, splay alignment twist angle $ω_R$ becomes (−θ+180°) and since θ is positive (+) when taking the left turn θ of FIG. 10, alignment twist angle $ω_L$ becomes its complementary angle (−θ−180°).

That is to say, in FIGS. 9 and 10, splay alignment twist angle ω can take any one of the four twist states of (±θ+180°) and (±θ−180°).

Twist angle φ in FIGS. 9 and 10, when a cell structure is the twisted uniform alignment, is +θ and −θ. When θ is 0°≦θ≦90°, if twisted uniform alignment is realized, each ω has to be (±θ+180°) and (±θ−180°). In the case, bounds of angles ω is |±θ±180°|=90° to 270°.

This bound of angle is alike bounds of angles that is realized the prior art ST cell. That is to say, if the twisted play alignment is realized, in addition, twist angle ω is bound of angles of that is realized the prior art ST cell, then twist angle has to be ±θ, in addition, a twist angle ω in the cell has to be (±θ+180°) or (±θ−180°). The structure is a first characteristics of this invention, and is conceptually sketched in FIG. 11.

Furthermore, when taking helically twisting power of the alignment in the layer thickness direction of the liquid crystal molecules rotating once as P and the liquid crystal layer thickness as d, a ratio of d/P shows the degree of rotative power of the liquid crystal materials in the liquid crystal layer thickness.

Therefore, when this is expressed as an angle, it becomes d/P×360°. If a twist angle of a cell is controlled, then the directions of liquid crystal moleculars on the surface of two substrates and d/P have to be elected pertinently. Value of angles φ and ω when θ is 0°≦θ≦90° can be θ+180°×n (n=0,1,2, . . . ). Also,if the value ω is an angle of this invention that is ±θ180° of ±θ−180°, then d/P×360° has to the value ω less than ±90°.

In this way, when cell twist angle φ of uniform alignment is ±θ and liquid crystal twist angle ω is ±θ+180°, d/P is ±θ+180°−90°<d/P×360°<±θ+180°+90° and when liquid crystal twist angle ω is ±θ−180°, d/P is

±θ−180°−90°<d/P×360°<±θ−180°+90°.

This item is a solution for a desired structure by this invention.

This twist direction and degree of twist of the liquid crystal molecules can be controlled by the type and amount of chiral dopant mixed with the liquid crystal. As practical materials, the chiral dopants for left turn as octyl-2-oxy-4-(4'-n-hexyloxy)-benzolate (S-811, E. Merck) and for right turn as 4-cyano-4'-(2-methylbutyl)-biphenyle (CB-15, Merck limited) can be used.

The liquid crystal display device of this invention, in practice, has a cell structure in which the liquid crystal alignment has a so-called splay orientation or more than 180° with a twist angle ω of 250°.

In this case of this structure, no bias of charge density is generated in the voltage applied state. If a voltage is applied to the cell, a charge density may be generated in the liquid crystal layer. The direction of shift of the charge is reasoned along each of liquid crystal molecular's directors with entire propriety. It is considered that the charge mentioned above is generated from the liquid crystal materials, orientation film material and their impurities. Accordingly, showing a liquid crystal alignment in FIGS. 13(a) or (b), the direction of shift of the charge may be arrows "e". According to the invention, a liquid crystal alignment is as FIG. 12 and FIG. 13. Because the liquid crystal alignment has twist of angle of 180° within ±90°. There are some directions of shift of the charge at equal amount to both of right and left sides.

Also, no bias of the charge density is generated when a voltage is applied to electrodes 14 and 15 from power source 16. Therefore, theoretically, sticking will not occur.

For example, liquid crystal alignment of the prior art device is as FIGS. 13(a) and (b).

It is considered that the charge mentioned above is generated from the liquid crystal material and orientation film material used. However, the direction of shift of the charge in the state when a voltage is applied to the cell is not only from right to left, as in the case of the prior art device in FIG. 13(a), it may also take the reverse direction, as shown in FIG. 13(b), depending on the type of charge. Also, in the case of this structure, bias of the charge density is generated, and sticking will occur.

The following is a more detailed description of the sticking phenomenon. The case when the direction of the charge shift of a prior art uniform alignment ST cell is from left to right, as shown in FIG. 13(b), is studied. In the case of the twist amount of the prior art ST cell being 240° as shown in FIG. 15, the shift direction of the charge is a direction of about $z_0$ when 0≦z≦d/2, and of about $z_d$ when d/2≦z≦d. Therefore, as shown in FIG. 16, when a voltage is continuously applied to a display screen of liquid crystal cells as expressed by the pattern of the square ABCD, the relative charge density will follow the charge shift direction described above in the charge applied portions and the charge not applied portions, and particularly at the boundary portions between them. The result of this is that the effective values of the external voltages applied to the liquid crystal layer differ. Therefore, this leads to sticking.

That is to say, as can be seen from FIG. 16, with regard to the change of charge density at the boundary portions, that at the A–B boundary portion is greater than that at the A–D boundary portion which is parallel to y–y'. The same can be said for the B–C boundary portion and the D–C boundary portion. The change in charge density which becomes a problem as actual sticking occurs at the A–B boundary portion and the D–C boundary portion. The degree of change of charge density which occurs in the A–B boundary portion and the D–C boundary portion depends on the angle formed by the two charge shift directions in these boundary portions. When this angle is 0° (when the liquid crystal twist angle is 180°), the two charge shift directions are in complete agreement. In this case, the degree of change of charge density is the strongest.

In the contrary 180° case (the case of the liquid crystal twist angle being 360°), the two charge shift direction completely cancel out. Therefore, the degree of change of charge density is the weakest. Thus, the degree of sticking depends on the angle formed by the two charge shift directions. For convenience of explanation, this angle is defined as the sticking angle X. The smaller this sticking angel X, the greater the degree of sticking. As described above, in the prior art ST system, in the range of a twist angle of from more than 90° to less than 270°, sticking angle X only attains a value of less than 90°, as shown by the dotted line in FIG. 17. Therefore, the intensity of sticking became a great practical problem.

In this invention nematic liquid crystal of positive dielectric anisotropy is sandwiched between two electrode-fitted substrates. It has means of causing pre-tilt orientations which align the major axes of the liquid crystal molecules in one direction on the surfaces of these substrates. The alignment directions of the liquid crystal molecules on the surfaces of the two substrates are aligned in uniform directions on each substrate surface. If the angle formed by the direction vectors toward the substrate surfaces of the major axes of the liquid crystal molecules on the upper and lower substrate surfaces is taken as X (this angle is the sticking angle described above), this sticking angle X becomes $90° \leq X \leq 180°$) in the range of twist angles from more than 90° to less than 270°.

When sticking angle X is considered in this way, in the case of a twist angle of, for instance, 240°, as opposed to θ being 60° in the prior art ST system (uniform alignment), in the splay alignment of this invention it becomes its complementary angle which is $\omega=180°-\theta=180°-60°=120°$. Therefore, in the liquid crystal display device of this invention, the optical effect is almost equal to that of the prior art ST system when a voltage is not applied. In addition, since sticking angle X is large, the effect of reduction of the sticking phenomenon occurs.

FIG. 18 shows an example of the change of pre-tilt angle α for the liquid crystal thickness direction of a liquid crystal display device obtained in this way. This shows the case when the pre-tilt angles $\alpha_0$ on the upper and lower substrates are the same. If the thickness direction of the liquid crystal layer is taken as z and the thickness as d, the positive/negative reversal of the value of pre-tilt angle α at the position of the cell centre portion d/2 shows that the tilt of the liquid crystal molecules becomes reversed at position d/2 in the cell. The liquid crystal molecules near the centre of the cell in the case when a voltage is applied to this type of cell can be considered to rise in either the positive or negative direction with the same probability. Thus, poor orientation occurs when a voltage is applied, and the quality of display may deteriorate. In order to solve this problem, it is effective to make the sizes of pre-tilt angle $\alpha_0$ on the two substrates 11 and 12 differ so that $\alpha_{o1}>\alpha_{o2}$, as shown in FIG. 19. In other words, if the sizes of pre-tilt angle $\alpha_0$ on the two substrates are made to differ, the position $z_p$ at which the tilt of the liquid crystal molecules in the liquid crystal layer reverses will shift toward the substrate with the smaller pre-tilt angle $\alpha_{o2}$. Thus, as shown in FIG. 20, the direction in which the liquid crystal molecules in the liquid crystal layer thickness direction rise vertically is controlled in the state when a voltage is applied. Therefore, poor orientation does not occur when a voltage is applied. Also, in the same way as in the prior art ST system, by optimizing the pre-tilt angles on both substrates, the hysteresis curve for light transmissivity against voltage becomes the same as the curve shown in FIG. 5 when the applied voltage increases or decreases. That is to say, hysteresis does not occur.

Also, a twisted splay alignment such as in the liquid crystal display device of this invention can, in practice, be considered equivalent to a device constructed of two twisted uniform alignments with reversed tilt directions. As described above, it is necessary to make the pre-tilt angles of the upper and lower substrates differ from the viewpoint of preventing poor orientation when a voltage is applied. Therefore, in this case, the form of the alignments of the two liquid crystal layers are not symmetrical.

However, the two liquid crystal layer twist angles and the liquid crystal layer thicknesses become smaller than that of a prior art structure liquid crystal display device in which the overall layer thickness is composed of a twisted uniform alignment. Therefore, the response speed in the liquid crystal display device of this invention is faster than that of a liquid crystal display device with the prior art structure. Here, when the ratio of pre-tilt angles $\alpha_{o1}$ and $\alpha_{o2}$ is made larger, the angle of the tilt direction on one substrate increases. Therefore, the ratio of the layer thicknesses of the two liquid crystal layers mentioned above also becomes greater. Thus, in practice, the response speed also becomes a value close to that of a liquid crystal display device with the prior art structure in which the overall layer thickness is composed of a twisted uniform alignment. Therefore, when considered from the viewpoint of response speed, the smaller the difference between $\alpha_{o1}$ and $\alpha_{o2}$, the better. In practice, pre-tilt angle $\alpha_{o1}$ of one substrate should be set at more than 5°, and also the difference between $\alpha_{o1}$ and $\alpha_{o2}$ should be set less than 31°.

In this way, if taking the viewpoint of preventing poor orientation when a voltage is applied, a large difference between $\alpha_{o1}$ and $\alpha_{o2}$ is desirable.

However, when taking the viewpoint of response speed, contrary to this, the smaller the difference between $\alpha_{o1}$ and $\alpha_{o2}$, the better.

In the above way, the liquid crystal display device of this invention can prevent the drawback of sticking.

Also, when using this invention, in the state in which a voltage is not applied to the liquid crystal layer, the liquid crystal takes the so-called splay alignment. Therefore, the tilt angle of the liquid crystal molecular alignment seen from the viewing point is not uniform, and thus a wider viewing angle can be obtained than in the prior art uniform alignment.

BRIEF DESCRIPTION OF THE DRAWINGS

FIG. 2(a) is a simplified cross-sectional view to illustrate the tilt angle of a liquid crystal molecule, and (b) is a simplified plan view to illustrate the orientation direction of a liquid crystal molecule;

FIG. 3(a) is a simplified plan view showing the orientation directions of a liquid crystal with uniform alignment when a liquid crystal layer is positioned between two substrates, and (b) is a simplified cross-sectional view to illustrate the alignment of the liquid crystal molecules in (a);

DESCRIPTION OF THE PREFERRED EMBODIMENTS

The following are detailed descriptions of embodiments of the liquid crystal display device of this invention.

Embodiment 1

Figure 1A:
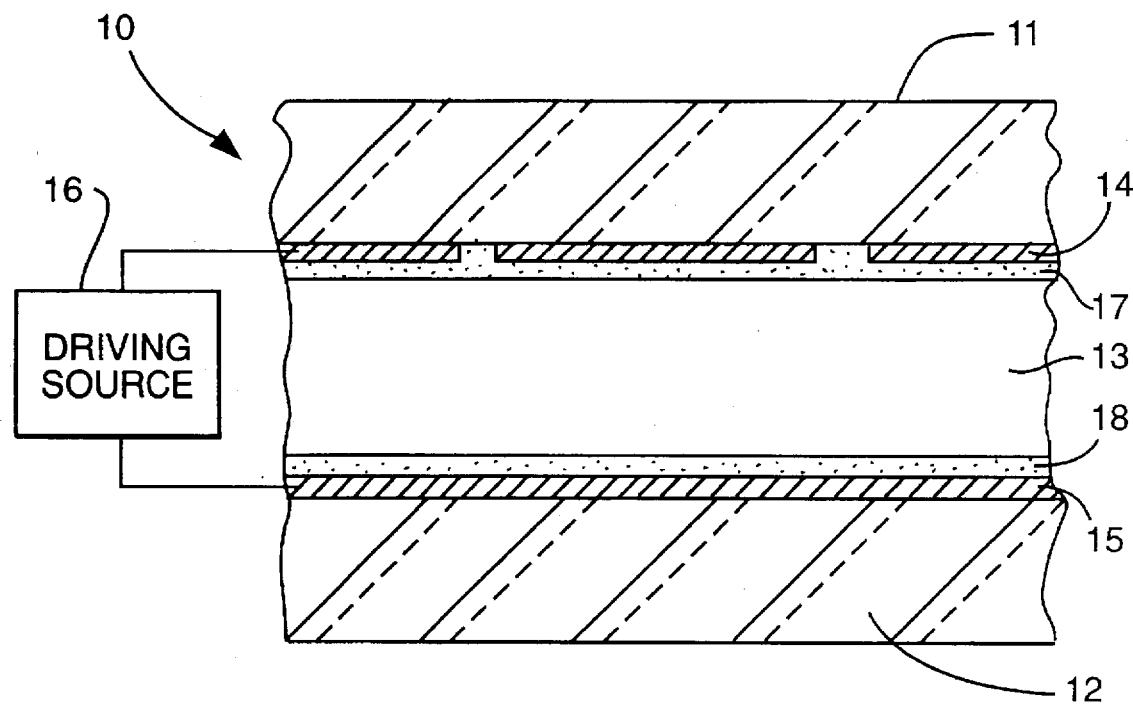
FIG. 1(a) is a partially enlarged cross-sectional view showing the liquid crystal display device of an embodiment of this invention, and (b) is a simplified plan view showing the relationship between rubbing orientation of the upper substrate and rubbing orientation of the lower substrate.
Figure 1B:
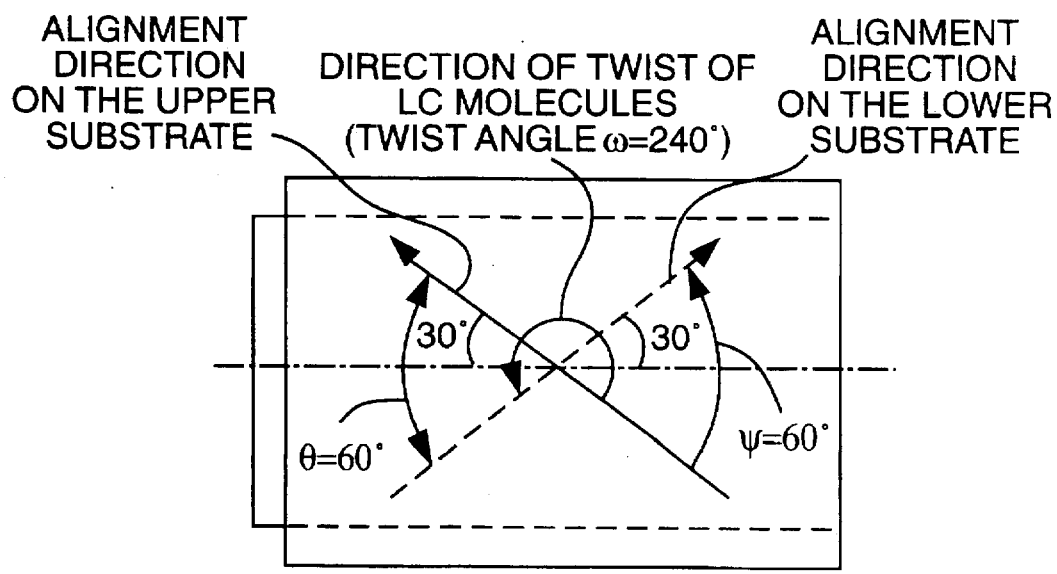
Figure 4:
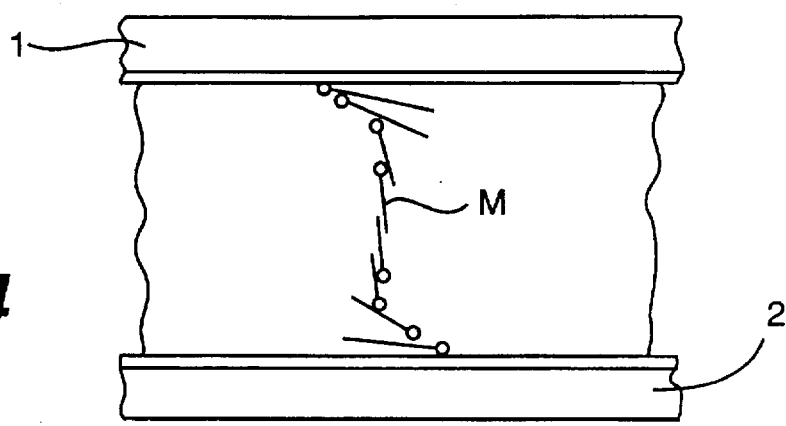
FIG. 4 is a simplified cross-sectional view showing the change in alignment of the liquid crystal molecules in the uniform alignment of FIG. 3(b) when a voltage is applied between the electrodes.
Figure 9:
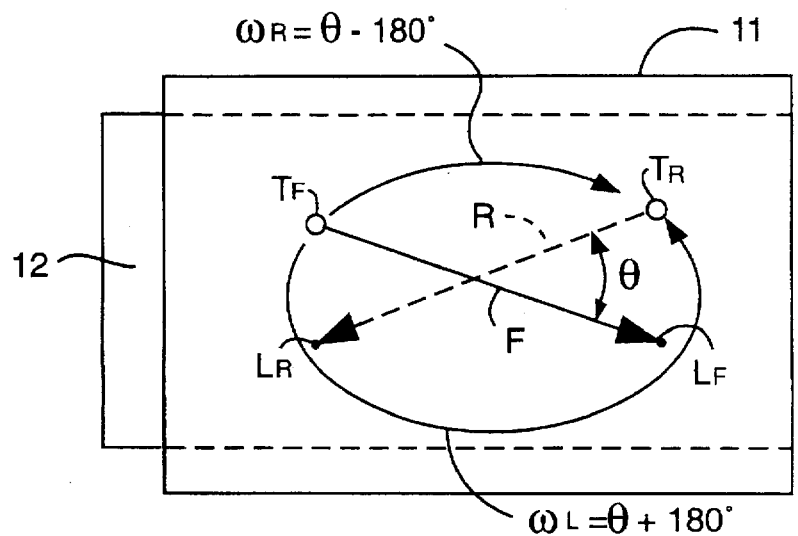
FIG. 9 is a simplified plan view to illustrate the structure of this invention, showing the orientation directions between the two substrates and the twist angle.
Figure 10:
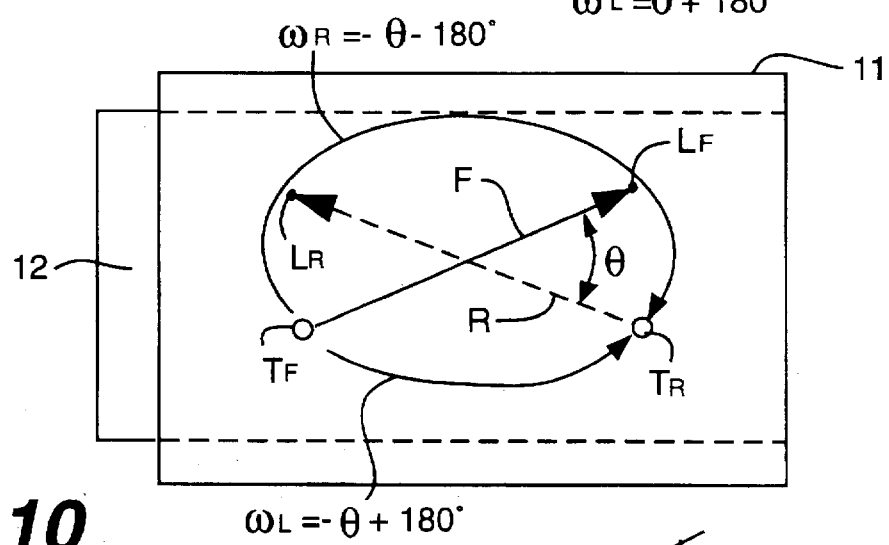
FIG. 10 is a simplified plan view to illustrate the structure of this invention, showing the orientation direction between the two substrates and the twist angle.
Figure 11:
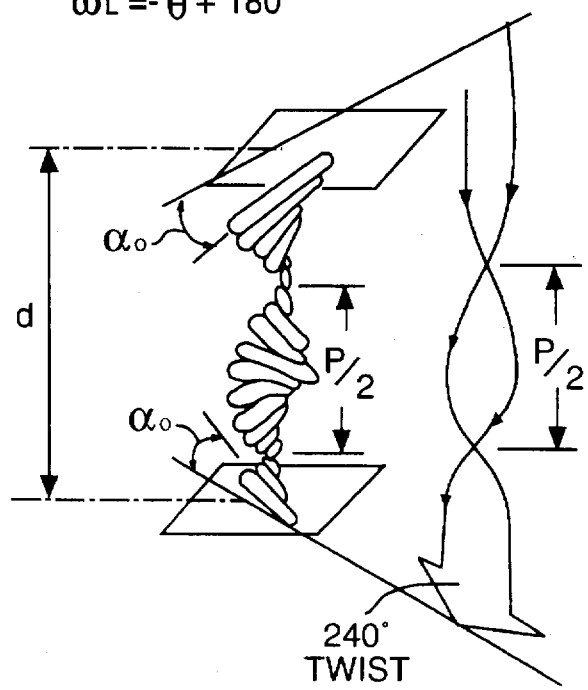
FIG. 11 is a perspective diagram showing the relationship between liquid crystal layer thickness d and the helical pitch P of twisted liquid crystal molecules.
Figure 12:
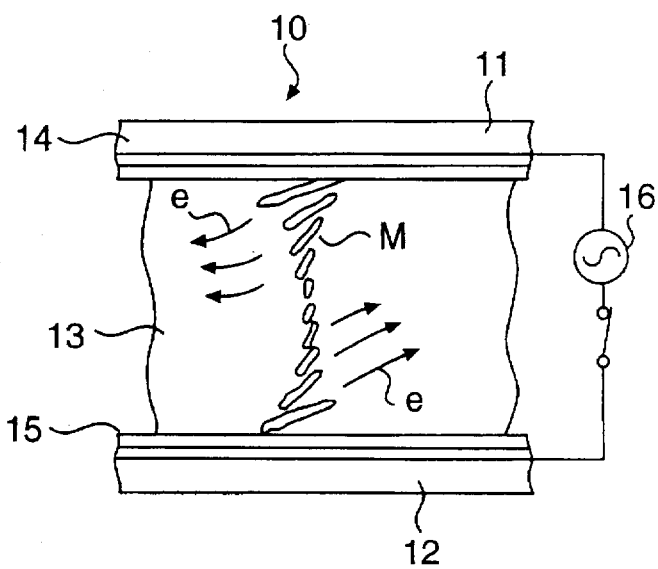
FIG. 12 is a simplified view to illustrate the action of the liquid crystal display device of this invention.
Figure 13A:
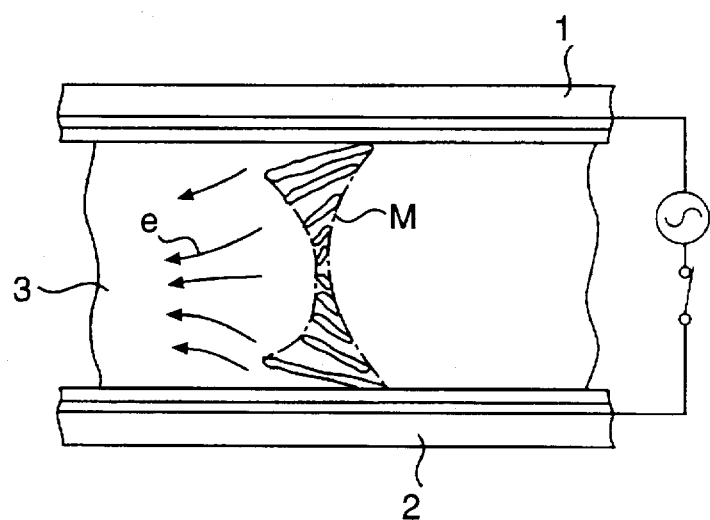
FIG. 13(a) is a simplified view to illustrate the action of the liquid crystal display device of a prior art device, and (b) is a simplified view to illustrate the action of the liquid crystal display device of a prior art device.
Figure 13B:
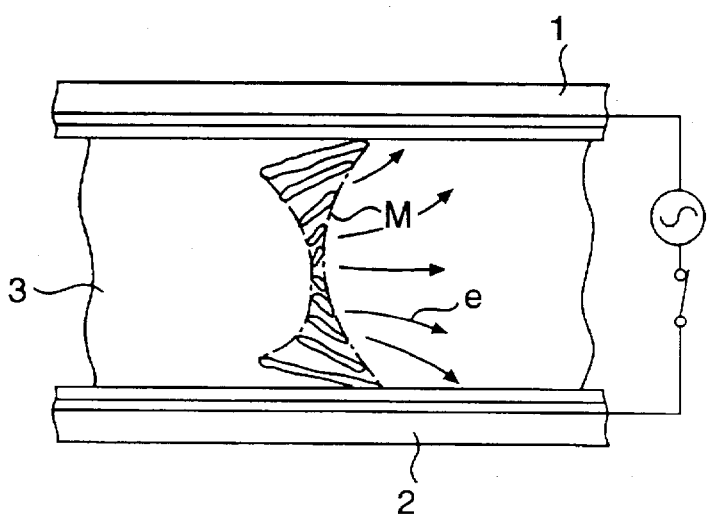
Figure 14:
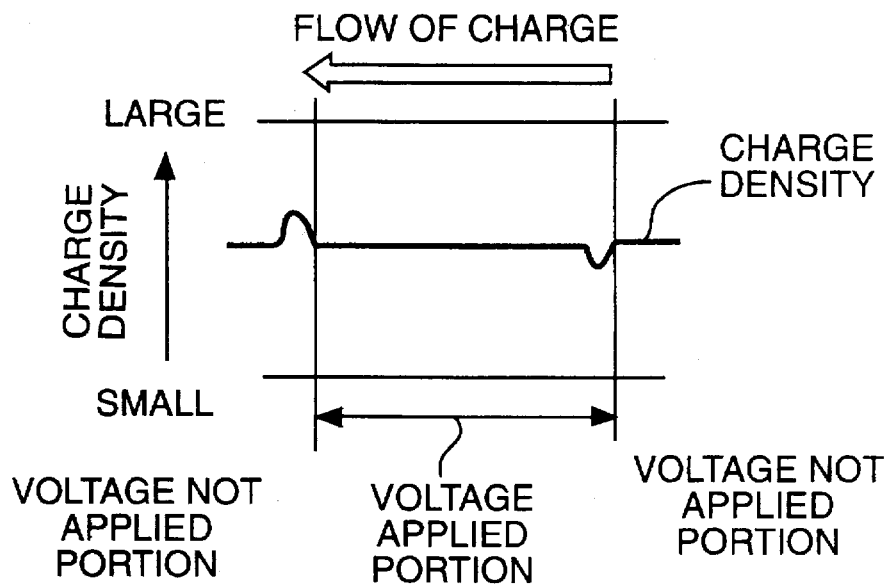
FIG. 14 is a simplified diagram to illustrate the charge density distribution of the prior art device in FIG. 13(a)
Figure 15:
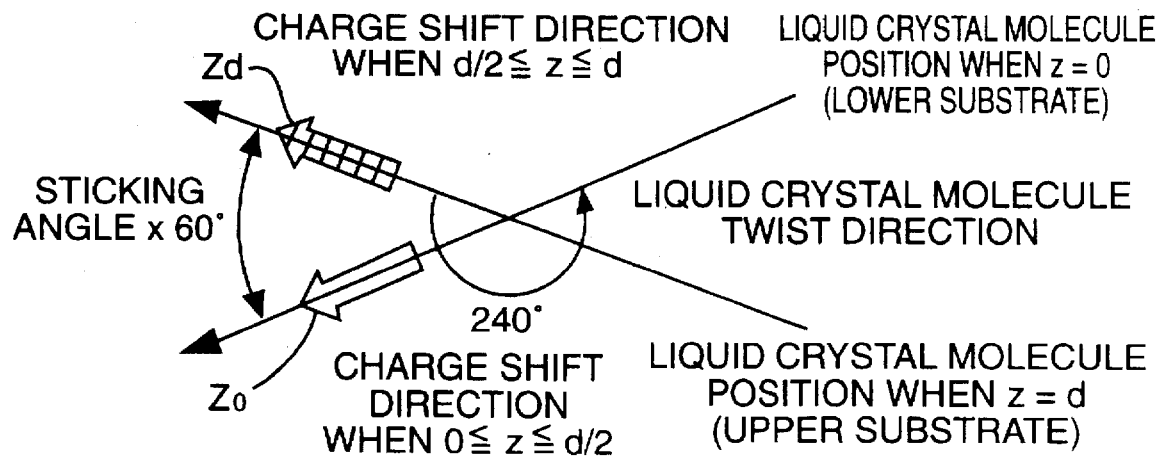
FIG. 15 is a diagram to illustrate the charge shift direction and the sticking angle.
Figure 16:
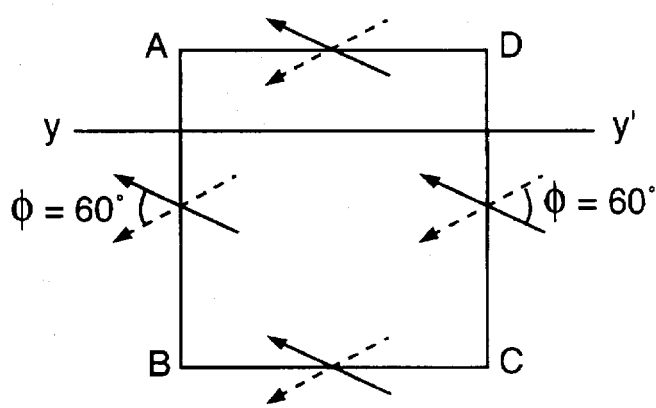
FIG. 16 is a diagram to illustrate the sticking due to a rectangular display pattern on the display surface.
Figure 17:
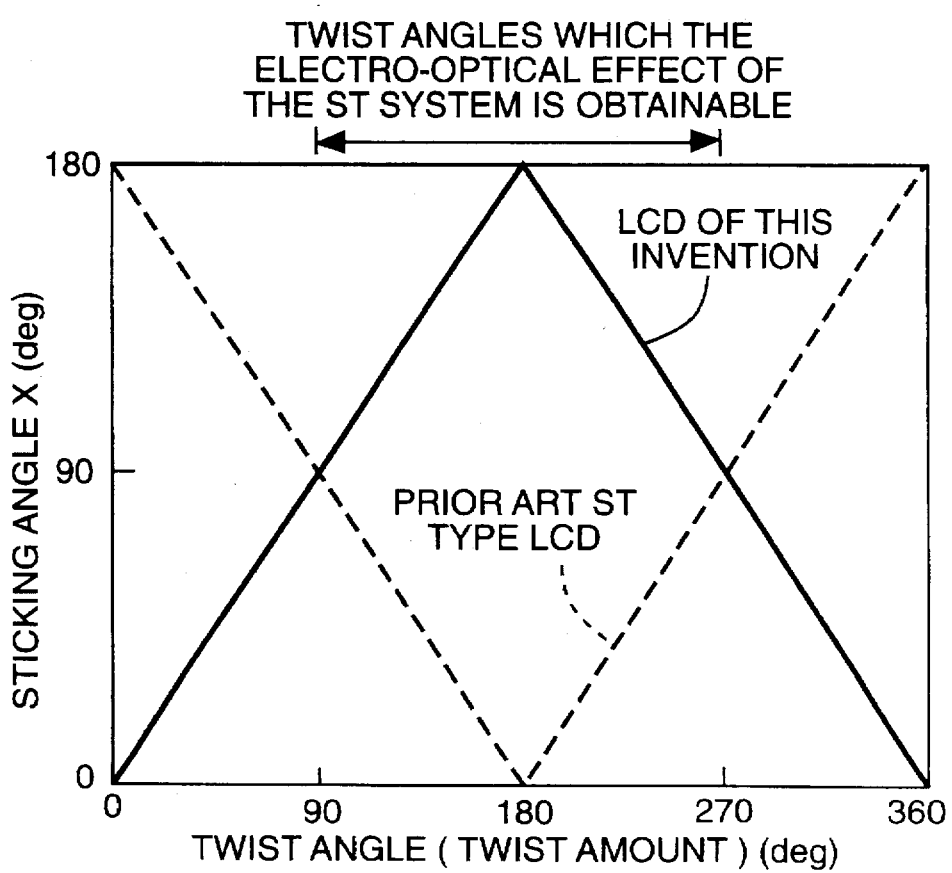
FIG. 17 is a graph showing the relationships between the twist angles and the sticking angles for this invention and the prior art device.
Figure 18:
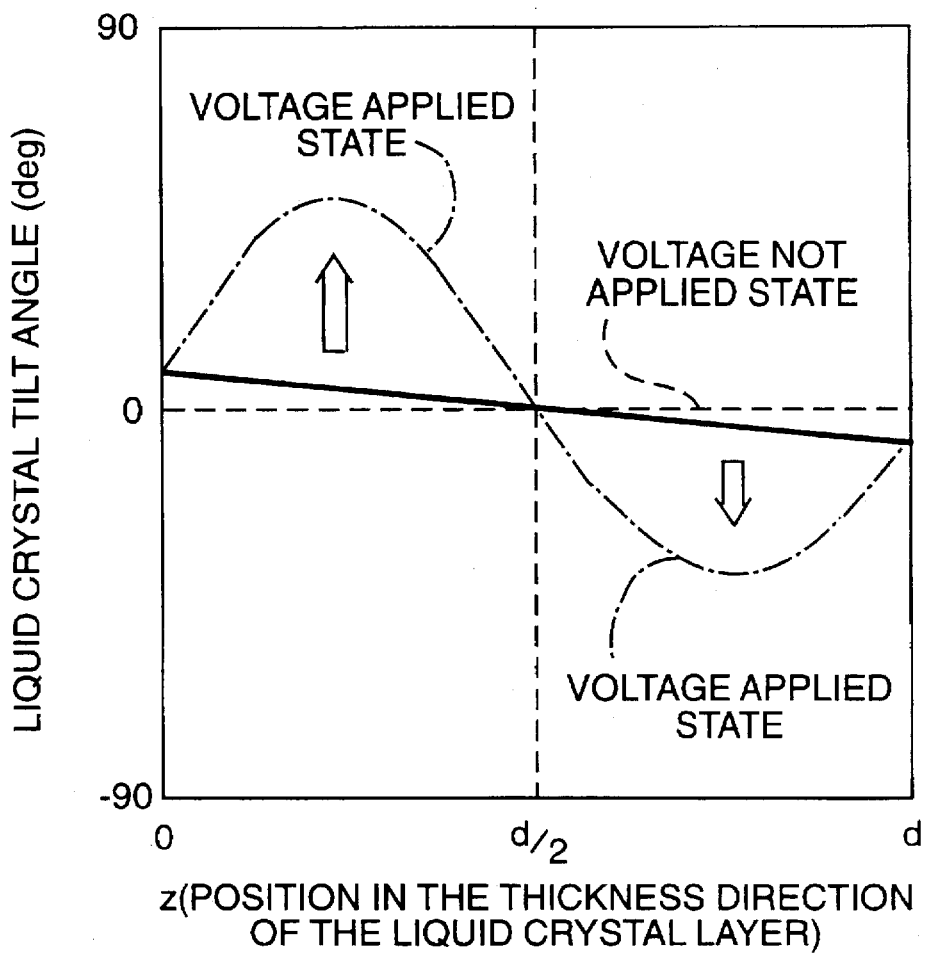
FIG. 18 is a graph showing the relationship between position in the thickness direction of the liquid crystal layer and tilt angle of the liquid crystal molecules.
Figure 19:
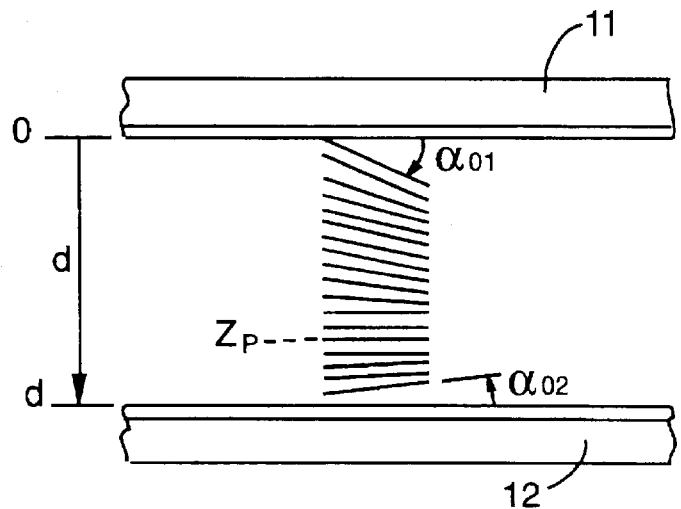
FIG. 19 is a simplified cross-sectional view showing the alignment of the liquid crystal molecules when a voltage is not applied in the structure of this invention.
Figure 20:
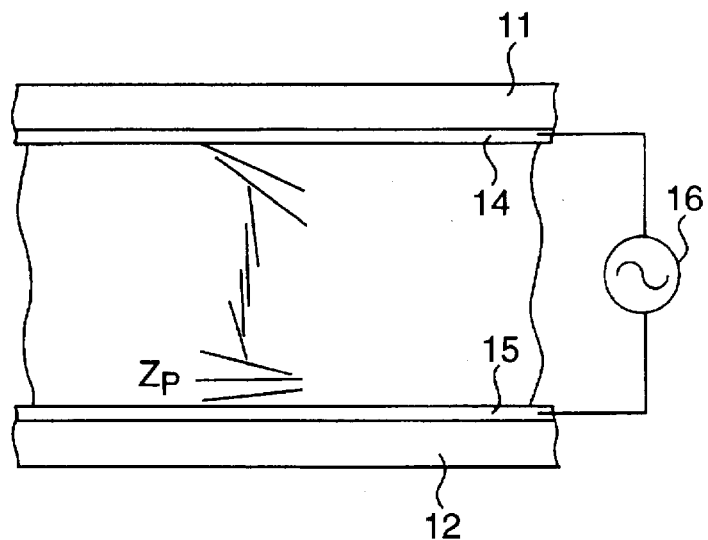
FIG. 20 is a simplified cross-sectional view showing the alignment of the liquid crystal molecules when a voltage is applied between the electrodes in FIG. 19.

In FIG. 1(a), a liquid crystal molecule orientation film 17 made of the optomar AL-1051 (produced by Japan Synthetic Rubber Co., Ltd., pre-tilt angle approximately 2°) is deposited on upper substrate 11 (z=0) on a transparent scanning electrode 14 side, which is fitted on the substrate 11. Another liquid crystal molecule orientation film 18 made of PSI-2301 (produced by Chisso Corp., pre-tilt angle approximately 7°) is formed on lower substrate 12 (z=d) on a transparent data electrode 15 side. As shown in FIG. 1(b), the twist angle $\omega$ is 240°. Rubbing treatment is carried out so that the director of the liquid crystal molecules on the incoming light side, i.e. the upper substrate side, is positioned on a direction of 60° from the director of the liquid crystal molecules on the outgoing light side, i.e. the lower substrate side. Liquid crystal display device 10 is produced by sealing nematic liquid crystal 13 (ZLI-2293 produced by Merck Co.) with a positive dielectric anisotropy of $\Delta n=0.134$ between these two substrates. When observing the state of twist of the liquid crystal molecules with reference to FIG. 9, the twist angle of the liquid crystal between upper and lower substrates 11 and 12 is expressed by liquid crystal molecular twist angle $\omega$ when the rubbing direction of scanning electrode side substrate 11 is taken as F and the rubbing direction of data electrode side substrate 12 as R.

The appropriate amount of left twist chiral dopant (produced by Merck Co., S-811) was added to the above liquid crystal material so that the twist pitch became 8.57 μm. Also, the liquid crystal layer thickness was set at 6.0 μm. Therefore, $\omega=d/P\times 360°$ was approximately 252°.

Figure 5:
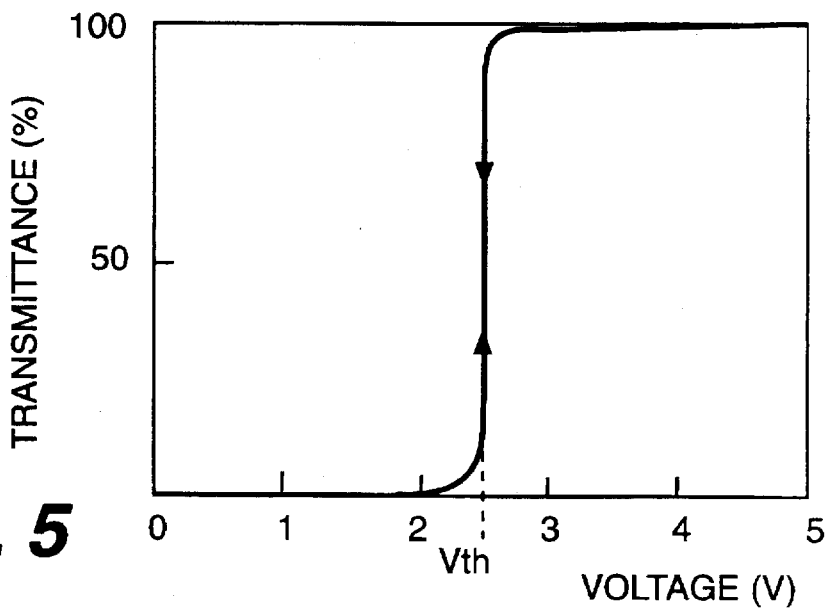
FIG. 5 is a graph showing the relationship between the voltage (V) applied to the liquid crystal layer and the transmissivity of the liquid crystal layer.
Figure 6:
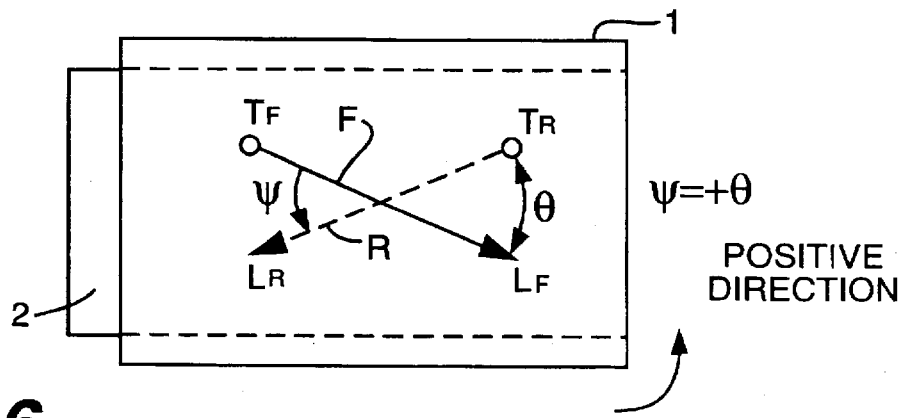
FIG. 6 is a simplified plan view to illustrate the twist angle of the liquid crystal in a uniform alignment, showing the case when the orientation directions of the liquid crystal molecules on the two substrates intersect.
Figure 7:
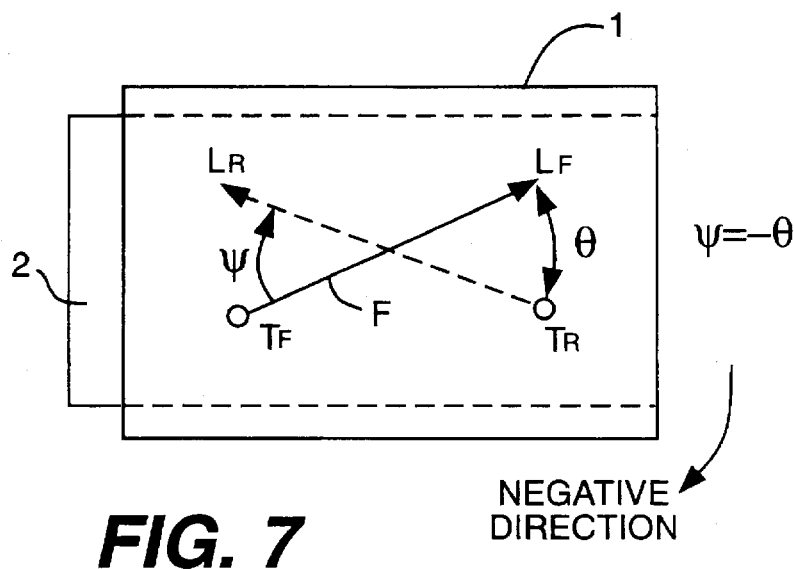
FIG. 7 is a simplified plan view to illustrate the twist angle of the liquid crystal in a uniform alignment, showing the case when the orientation directions of the liquid crystal molecules on the two substrates intersect in the reverse direction to the case in FIG. 6.

After, connecting driving source 16 to the liquid crystal display device and applying a voltage between 14 and 15, when the transmission—voltage curve was measured, a steep curve similar to the ST system shown in FIG. 5 was n this way was driven with a 1/240 duty drive. A block pattern was displayed in part of this liquid crystal display device, and this was taken as a selected voltage applied region. After being switched on for about 1 hour, the degree of occurrence of the sticking phenomenon was studied, taking the whole device as a selected voltage applied region. The whole device displayed a uniform density, no sticking phenomenon was observed, and there was absolutely no occurrence of memory (see Table 1).

Figure 21:
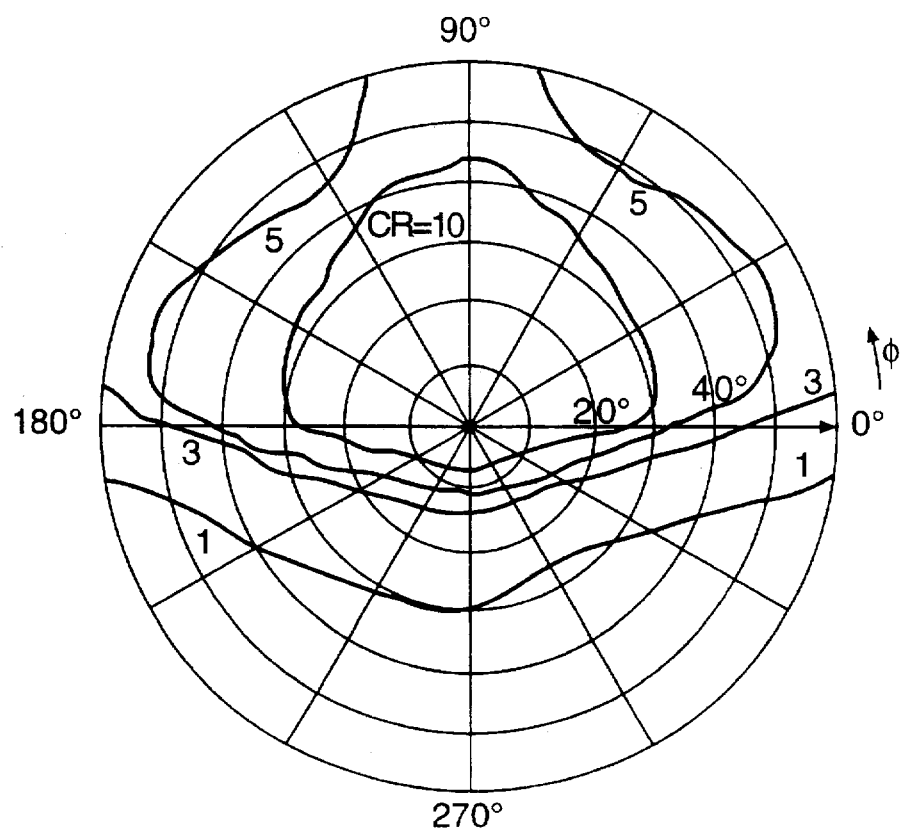
FIG. 21 is a distribution graph showing iso-contrast curves for an embodiment of this invention.

Also, the iso-contrast curve is shown in FIG. 21. A very wide viewing angle was obtained.

TABLE 1

| | | Cell Structure | Twist Angle | $d/P \times 360°$ | Tilt Angles | Vth (V) | γ (%) | Lighting Assessment |
|---|---|---|---|---|---|---|---|---|
| Embodiment | 1 | Splay | 240° | 250° | 2°, 7° | 2.1 | 6.5 | Good |
| | 2 | Splay | 240° (Right) | 250° | 2°, 7° | 2.1 | 6.7 | Good |
| | 3 | Splay | 180° | 200° | 4°, 7° | 1.9 | 8.2 | Good |
| | 4 | Splay | 180° | 200° | 4°, 12° | 2.0 | 7.5 | Good |

TABLE 1-continued

|  | | Cell Structure | Twist Angle | d/P × 360° | Tilt Angles | Vth (V) | γ (%) | Lighting Assessment |
|---|---|---|---|---|---|---|---|---|
| | 5 | Splay | 180° | 200° | 4°, 35° | 2.1 | 7.0 | Good |
| | 6 | Splay | 180° (Right) | 200° | 4°, 12° | 1.9 | 8.0 | Good |
| | 7 | Splay | 240° | 250° | 7°, 7° | 2.2 | 6.7 | Good |
| | 8 | Splay | 240° (Right) | 250° | 7°, 6° | 2.1 | 6.7 | Good |
| | 9 | Splay | 180° | 200° | 7°, 7° | 1.9 | 8.5 | Good |
| | 10 | Splay | 180° (Right) | 200° | 12°, 12° | 1.9 | 8.2 | Good |
| Compara- | 1 | Uniform | 240° | 205° | 7°, 7° | 2.1 | 6.3 | Sticking |
| tive | 2 | Uniform | 240° | 205° | 4°, 7° | 2.1 | 6.1 | Sticking |
| Example | 3 | Uniform | 180° | 170° | 4°, 7° | 1.9 | 7.2 | Sticking |

Embodiment 2

Figure 22:
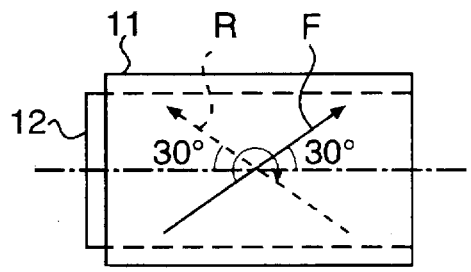
FIG. 22 is a simplified plan view showing the angle of intersection of the orientation directions of the two substrates and the twist angle of the liquid crystal of another embodiment of this invention.

A liquid crystal display device was produced by altering the rubbing directions F and R in the liquid crystal display device of Embodiment 1 as shown in FIG. 22, and also by adding a right twist chiral dopant, i. e. ester system R-811 (E. Merck) instead of the left twist chiral dopant.

When the transmittance-voltage curve of the liquid crystal display device obtained in this way was measured, a steep curve was obtained. Also, when the same lighting test as in Embodiment 1 was carried out, absolutely no sticking occurred, and good visibility was maintained.

Moreover, when the lighting was assessed, there was absolutely no occurrence of poop orientation and memory (see Table 1).

Embodiment 3

Figure 23:
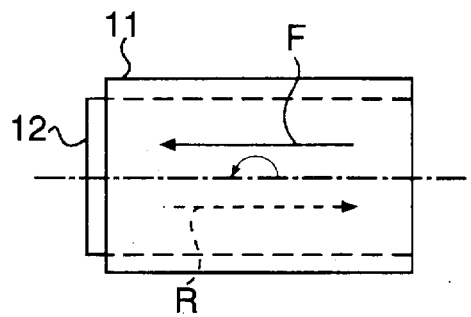
FIG. 23 is a simplified plan view showing the angle of intersection of the orientation directions of the two substrates and the twist angle of the liquid crystal of another embodiment of this invention.

In the liquid crystal display device of Embodiment 1, the rubbing directions F and R was altered as shown in FIG. 23. As the orientation films, SE-150 (produced by Nissan Chemical Industries Ltd., pre-tilt angle approximately 4°) was formed on the scanning electrode side substrate (z=0) instead of AL-1051, while the previously mentioned PSI-2301 was formed on the data electrode side substrate (z=d), and the twist angle was made 180°. Also, d/P was set to 0.55, which is greater than 180°/360°.

When the same lighting test as in Embodiment 1 was carried out, there was absolutely no sticking, and good visibility was maintained.

Also, when the lighting was assessed, there was absolutely no occurrence of poor orientation and memory (see Table 1).

Embodiment 4

A liquid crystal display device was produced by forming PSI-2401 (produced by Chisso Corp., pre-tilt angle approximately 12°) as the orientation film on the data electrode side substrate instead of the PSI-2301 in Embodiment 3.

When the transmittance-voltage curve of the liquid crystal display device obtained in this way was measured, a steeper curve than in Embodiment 3 was obtained.

Also, when the same lighting test as in Embodiment 1 was carried out, absolutely no sticking occurred, and good visibility was maintained.

Moreover, when the lighting was assessed, there was absolutely no occurrence of poor orientation and memory (see Table 1).

Embodiment 5

A liquid crystal display device was produced by carrying out oblique vapour deposition of SiO on the data electrode side substrate instead of the PSI-2301 in Embodiment 3. The pre-tilt angle of the liquid crystal molecules on the data electrode side was made 35°.

When the transmittance-voltage curve of the liquid crystal display device obtained in this way was measured, a steeper curve than in Embodiment 4 was obtained.

Also, when the same lighting test as in Embodiment 1 was carried out, absolutely no sticking occurred, and good visibility was maintained.

Moreover, when the lighting was assessed, there was absolutely no occurrence of poor orientation and memory (see Table 1).

Embodiment 6

A liquid crystal display device was produced by adding a right twist chiral dopant (produced by Merck Co., R-811) instead of the left twist chiral dopant in Embodiment 4.

When the transmittance-voltage curve of the liquid crystal display delve obtained in this way was measured, a steep curve was obtained. Also, when the same lighting test as in Embodiment 1 was carried out, absolutely no sticking occurred, and good visibility was maintained.

Moreover, when the lighting was assessed, there was absolutely no occurrence of poor orientation and memory (see Table 1).

Embodiment 7

A liquid crystal display device was produced by forming PSI-2301 on both substrates as the orientation films in Embodiment 1.

Although the liquid crystal display device obtained in this way had some cells with partially poor orientation when lighting was assessed, the transmittance-voltage curve was steep. Also, when the same lighting test as in Embodiment 1 was carried out, absolutely no sticking occurred, and good visibility was maintained (see Table 1).

Embodiment 8

A liquid crystal display device was produced by forming PSI-2301 on both substrates as the orientation films and altering the rubbing strengths on the upper and lower substrates in the liquid crystal display device of Embodiment 2. Also, the pre-tilt angles of the two substrate surfaces were made 7° and 6° and a right twist chiral dopant (produced by Merck Co., R-811) was added instead of the left twist chiral dopant.

Although the liquid crystal display device obtained in this way, in rare cases (12 cells out of 100), had some cells with slightly poor orientation when lighting was assessed, the transmittance-voltage curve was steep. Also, when the same lighting test as in Embodiment 1 was carried out, absolutely no sticking occurred, and good visibility was maintained (see Table 1). Moreover, the response speed, with a total of as little as 240 ms for rising and falling, was very much faster than that of a prior art structure (generally a total of about 400 ms).

Embodiment 9

A liquid crystal display device was produced by forming PSI-2301 on both substrates as the orientation films in Embodiment 3.

Although the liquid crystal display device obtained in this way had some cells with a few partially poor orientation when lighting was assessed, the transmittance-voltage curve was steep. Also, when the same lighting test as in Embodiment 1 was carried out, absolutely no sticking occurred, and good visibility was maintained (see Table 1).

Embodiment 10

A liquid crystal display device was produced by forming PSI-2401 on both substrates as the orientation films in Embodiment 5.

Although the liquid crystal display device obtained in this way has some cells with a few partially poor orientation when lighting was assessed, the transmittance-voltage curve was steep. Also, when the same lighting test as in Embodiment 1 was carried out, absolutely no sticking occurred, and good visibility was maintained (see Table 1).

Embodiment 11

Figure 24:
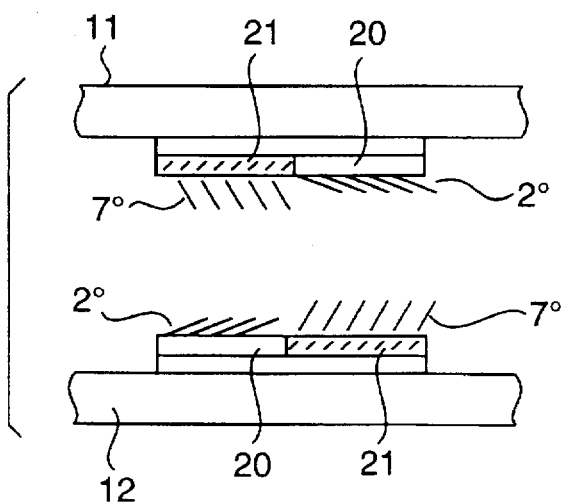
FIG. 24 is a simplified cross-sectional view showing the structure of another embodiment of this invention.

In Embodiment 1, orientation films 20 and 21 in which the pre-tilt angles were 7° and 2° were formed on the two substrates 11 and 12, as shown in FIG. 24. In each pixel, regions in which the pre-tilt angle was 7° and regions in which it was 2° were formed on the respective substrates in single pixels. The region of upper substrate 11 which corresponded to the region in which the pre-tilt angle of lower substrate 12 was 7° was made pre-tilt angle 2°, and the region of the upper substrate which corresponded to the region in which the pre-tilt angle of the lower substrate was 2° was made pre-tilt angle 7°. By this means, the liquid crystal molecular alignment region which formed one pixel became of two different liquid crystal molecular states.

The liquid crystal display device obtained in this way exhibited the same optical characteristics as in Embodiment 1 when a voltage was applied. Also, when the iso-contrast characteristic was measured, as well as giving almost the same effect for electro-optical characteristics in the substrate front surface observation direction, good characteristics were obtained, with viewing angle characteristics which were as wide as in Embodiment 1 and were even more symmetrical than in Embodiment 1.

Comparative Example 1

Figure 25:
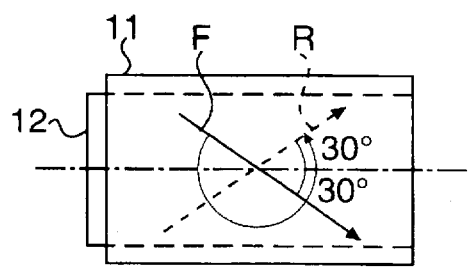
FIG. 25 is a simplified plan view showing the angle of intersection of the orientation directions of the two substrates and the twist angle of the liquid crystal of another embodiment of this invention.

An ST type liquid crystal display device was produced with a twist angle of 240° by altering the rubbing direction in Embodiment 1 as shown in FIG. 25. In this case, d/P was made 0.57.

When the transmittance-voltage characteristic of the liquid crystal display device obtained in this way was measured, a steep curve was obtained in the same way as for Embodiment 1. However, when the same lighting test as in Embodiment 1 was carried out, sticking occurred at the edges of the block pattern, and the visibility was impaired (see Table 1).

Figure 26:
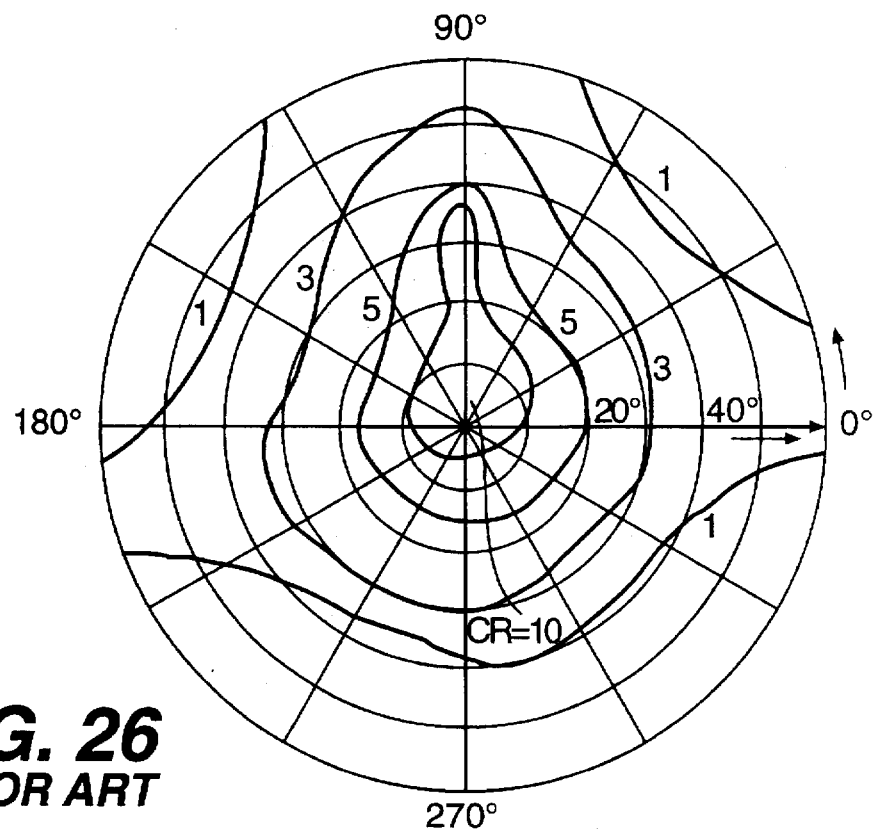
FIG. 26 is a distribution graph showing iso-contrast curves for an ST type liquid crystal display device.
Figure 27:
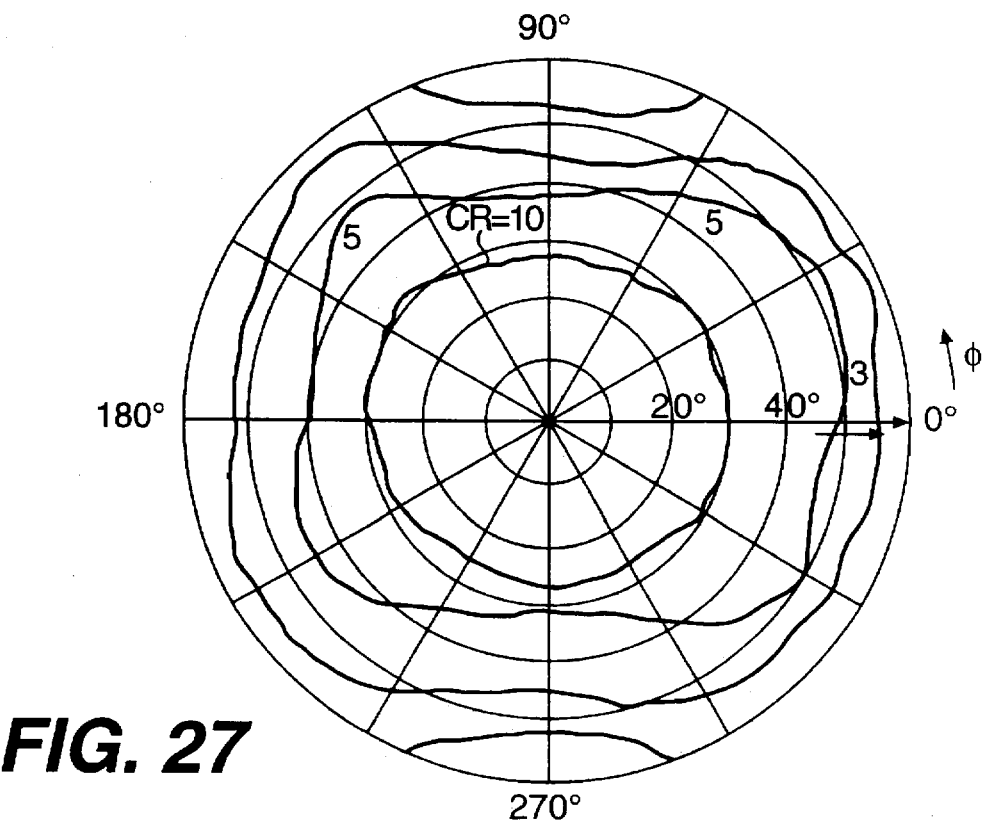
FIG. 27 is a distribution graph showing iso-contrast curves for an embodiment of the invention.

Also, the viewing angle was narrow, as shown by the iso-contrast curve in FIG. 26. The viewing angle with no inversion was as narrow as +35°, −42°. The response speed was as slow as a total of 400 ms for rising and falling.

Comparative Example 2

As ST type liquid crystal display device was produced with a twist angle of 240° by forming SE-150 on the scanning electrode side substrate (z=0) and PSI-2301 on the data electrode side substrate (z=d) as the orientation films in Comparative Example 1

When the transmittance-voltage characteristic of the liquid crystal display device obtained in this way was measured, a steep curve was obtained in the same way as for Embodiment 1. However, when the same lighting test as in Embodiment 1 was carried out, sticking occurred at the edges of the block pattern, and the visibility was impaired (see Table 1).

Comparative Example 3

Figure 8A:
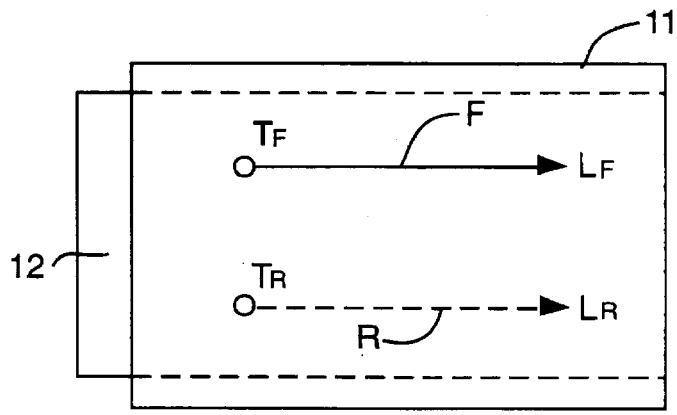
FIG. 8(a) is a simplified plan view to illustrate the orientation directions of splay-aligned liquid crystal when a liquid crystal layer is positioned between two substrates on which alignment treatment has been carried out, and (b) is a simplified plan to illustrate the alignment of the liquid crystal molecules in (a)
Figure 8B:
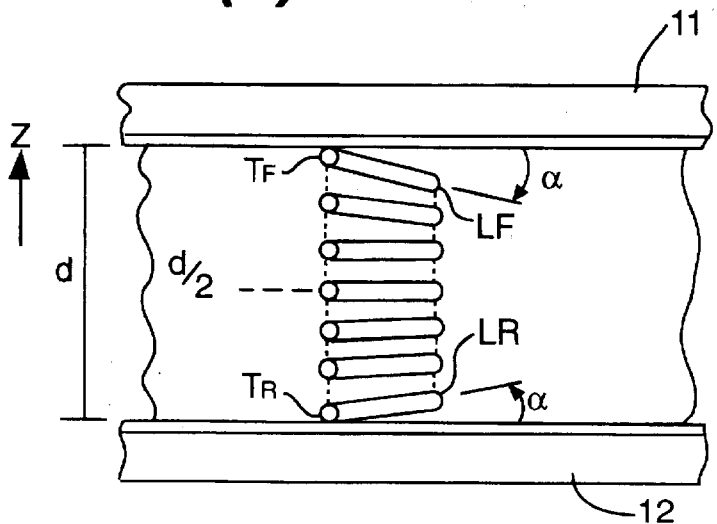

An ST type liquid crystal display device was produced with a twist angle of 180° by altering the rubbing direction in Embodiment 3 as shown in FIG. 8(a). In this case, d/P was made 0.43. When the same lighting test as in Embodiment 1 was carried out, sticking occurred at the edges of the block pattern, and the visibility was impaired (see Table 1).

When using this invention, a liquid crystal display device can be obtained which has stable orientation, a steep electro-optical characteristic, and with a wide viewing angle in which no sticking phenomenon occurs with high contrast.

In these embodiments, only the simple matrix drive of the ST system has been described. However, needless to say, the same effect can be obtained with various types of simple matrix drive which are combinations of other methods including the ECB system and the GH system, and even using active matrix drives which use active devices such as TFT and MIM.

What is claimed is:

1. A liquid crystal display device in a super twist system comprising:

two substrates which have transparent electrodes on their surfaces;

a twisted nematic liquid crystal layer of positive dielectric anisotropy sandwiched between the electrodes for applying a voltage to the layer; and liquid crystal molecule orientation films deposited on the electrodes for causing a pre-tilt orientation, which aligns the major axes of liquid crystal molecules of the liquid crystal layer in one direction on surfaces of the substrates, and in which an angle of intersection of the liquid crystal alignment directions on the surfaces of the substrates is $\theta$ ($0°<\theta<90°$) and a cell twist angle is $\phi$, which is determined to give a uniform twist alignment to the liquid crystal layer by the tilt orientation on the substrates when the cell twist angle matches the twist angle of the liquid crystal layer, the liquid crystal molecule orientation films comprising:

means for taking a twist angle $\omega$ of the liquid crystal layer wherein $\phi$ equals $\pm\theta$ (positive (+) means that the rotation of twist is to the left-handed rotation, and negative (−) means that the rotation of twist is a right-handed rotation), and the twist angle $\omega$ of the liquid crystal layer is $\pm\theta+180°$ or $\pm\theta-180°$ for which $\theta$ has the same sign as for the cell twist angle, in a state when the voltage applied to the liquid crystal layer is less than a threshold voltage, thereby providing a splay twist alignment for twisted nematic liquid crystal layer.

2. The liquid crystal display device as claimed in claim 1, wherein the sizes of the pre-tilt angles of the liquid crystal molecules on the two substrates differ from each other.

3. The liquid crystal display device as claimed in claim 1, wherein the liquid crystal molecule orientation film on one pixel comprises two or more types of liquid crystal molecule alignment regions is which the liquid crystal molecule alignment states differ from each other.

* * * * *